United States Patent
Chou

(10) Patent No.: US 9,538,128 B2
(45) Date of Patent: Jan. 3, 2017

(54) SYSTEM AND METHOD FOR MANAGING VIDEO PROCESSING IN A NETWORK ENVIRONMENT

(75) Inventor: Jim Chen Chou, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 825 days.

(21) Appl. No.: 13/036,963

(22) Filed: Feb. 28, 2011

(65) Prior Publication Data

US 2012/0219062 A1  Aug. 30, 2012

(51) Int. Cl.

| H04N 7/12 | (2006.01) |
| H04N 7/14 | (2006.01) |
| H04N 21/2389 | (2011.01) |
| H04N 21/647 | (2011.01) |
| H04N 7/15 | (2006.01) |

(52) U.S. Cl.
CPC ........ *H04N 7/147* (2013.01); *H04N 21/23892* (2013.01); *H04N 21/64784* (2013.01); *H04N 7/15* (2013.01)

(58) Field of Classification Search
CPC ..................... H04N 7/17354; H04N 21/23103; H04N 21/24
See application file for complete search history.

(56) References Cited

U.S. PATENT DOCUMENTS

| 5,367,629 | A  | * | 11/1994 | Chu et al. ................ 382/253 |
| 6,310,915 | B1 | * | 10/2001 | Wells et al. ............ 375/240.03 |
| 6,359,901 | B1 | * | 3/2002  | Todd et al. .................. 370/465 |
| 6,434,197 | B1 | * | 8/2002  | Wang ............... H04N 21/23655 375/240.03 |
| 6,735,735 | B1 | * | 5/2004  | Ohira et al. .................. 714/776 |
| 6,756,987 | B2 | * | 6/2004  | Goyins et al. ............... 345/540 |
| 7,054,371 | B2 | * | 5/2006  | Kim .......................... 375/240.26 |
| 7,327,791 | B1 | * | 2/2008  | Sekiguchi et al. ........ 375/240.27 |
| 7,477,691 | B1 | * | 1/2009  | Knee ........................ 375/240.26 |
| 7,924,851 | B2 | * | 4/2011  | Kim et al. ................ 370/395.64 |
| 8,094,730 | B2 | * | 1/2012  | Yim .......................... 375/240.27 |
| 8,130,839 | B2 | * | 3/2012  | Kawashima et al. .... 375/240.16 |
| 8,238,424 | B2 | * | 8/2012  | Chang et al. ............ 375/240.06 |

(Continued)

FOREIGN PATENT DOCUMENTS

EP   1720358 A2 * 11/2006

OTHER PUBLICATIONS

Timmerer, Christian, Michael Grafl, and Hermann Hellwagner. "Scalable Video Coding in Content-Aware Networks: Research Challenges and Open Issues." Proc. International Tyrrhenian Workshop on Digital Communications (ITWDC), Ponza, Italy (Sep. 2010).*

(Continued)

*Primary Examiner* — Sath V Perungavoor
*Assistant Examiner* — Dakshesh Parikh
(74) *Attorney, Agent, or Firm* — Patent Capital Group

(57) ABSTRACT

A method is provided in one example embodiment and includes establishing a communication channel between a first network element and a second network element; identifying a video processing characteristic for a data stream in a network environment; embedding a plurality of bits into the data stream in order to identify the video processing characteristic that has been identified by the first network element; and communicating the data stream with the plurality of bits to a next destination.

18 Claims, 6 Drawing Sheets

| | | |
|---|---|---|
| TAG_DOWNSCALED | VALUE = 0 OR 1 | SPECIFIES WHETHER DOWNSCALING WAS PERFORMED ON THE VIDEO SEQUENCE |
| TAG_FILTERED | VALUE = 0 OR 1 | SPECIFIES WHETHER A NOISE/ENHANCEMENT FILTER WAS APPLIED TO THE VIDEO SEQUENCE |
| TAG_FILTER_TYPE | VALUE = {NOISE, ENHANCEMENT, LOWPASS, SHARPENING, ETC.} | SPECIFIES THE FILTER TYPE APPLIED TO VIDEO SEQUENCE |
| TAG_PSNRD | VALUE = {-PSNR DIFFERENCE BETWEEN INCOMING VIDEO SEQUENCE AND OUTGOING VIDEO SEQUENCE} | |
| TAG_NUM_TRANSCODINGS | VALUE = {INTEGER FROM 0-255} | SPECIFIES NUMBER OF TRANSCODINGS THAT HAVE OCCURRED. THIS VALUE WOULD BE INCREMENTED EACH TIME A MANE PERFORMS A TRANSCODING |
| TAG_CUR_JITTER | VALUE = {INTEGER FROM 0-255 THAT MAPS TO A PRE-DEFINED JITTER RANGE} | THIS VALUE WOULD BE MODIFIED BY EACH MANE TO ACCOUNT FOR THE JITTER INTRODUCED BETWEEN ITSELF AND THE PREVIOUS DEVICE |
| TAG_CUR_DELAY | VALUE = {INTEGER FROM 0-255 THAT MAPS TO A PRE-DEFINED DELAY RANGE} | THIS VALUE WOULD BE MODIFIED BY EACH MANE TO ACCOUNT FOR THE DELAY INTRODUCED BETWEEN ITSELF AND THE PREVIOUS DEVICE |
| TAG_JITTER_THRESHOLD | VALUE = {INTEGER FROM 0-255 THAT MAPS TO A PRE-DEFINED JITTER RANGE} | SET BY ENDPOINTS TO SPECIFY AN ACCEPTABLE JITTER THRESHOLD. MAY BE USED BY MANEs TO DROP PACKETS THAT EXCEED THRESHOLD |
| TAG_DELAY_THRESHOLD | VALUE = {INTEGER FROM 0-255 THAT MAPS TO A PRE-DEFINED DELAY RANGE} | SET BY ENDPOINTS TO SPECIFY AN ACCEPTABLE DELAY THRESHOLD. MAY BE USED BY MANEs TO DROP PACKETS THAT EXCEED THRESHOLD |
| TAG_GAMMA_TRANSMIT | VALUE = {INTEGER FROM 0-255 THAT MAPS TO A PRE-DEFINED GAMMA RANGE} | SPECIFIES THE TRANSMITTER GAMMA AND MAY BE USED BY A MANE OR ENDPOINT TO PERFORM COLOR CORRECTION/CONTRAST ENHANCEMENT |
| TAG_GAMMA_RECEIVE | VALUE = {INTEGER FROM 0-255 THAT MAPS TO A PRE-DEFINED GAMMA RANGE} | SPECIFIES THE RECEIVER GAMMA AND MAY BE USED BY A MANE OR ENDPOINT TO PERFORM COLOR CORRECTION/CONTRAST ENHANCEMENT |
| TAG_END | | SPECIFIES END OF LIST |

(56) References Cited

U.S. PATENT DOCUMENTS

| | | | | |
|---|---|---|---|---|
| 8,254,469 | B2* | 8/2012 | Au et al. | 375/240.27 |
| 8,259,794 | B2* | 9/2012 | Bronstein | H04N 19/147 375/240.03 |
| 8,406,134 | B2* | 3/2013 | Medina et al. | 370/231 |
| 8,477,841 | B2* | 7/2013 | Peng et al. | 375/240.02 |
| 2003/0012284 | A1* | 1/2003 | Kazayama et al. | 375/240.25 |
| 2005/0053288 | A1* | 3/2005 | Srinivasan et al. | 382/233 |
| 2005/0259877 | A1* | 11/2005 | Wang et al. | 382/236 |
| 2007/0025386 | A1* | 2/2007 | Riedel et al. | 370/445 |
| 2007/0201563 | A1* | 8/2007 | Yamaguchi et al. | 375/240.26 |
| 2007/0217502 | A1* | 9/2007 | Ammar et al. | 375/240.1 |
| 2008/0062018 | A1* | 3/2008 | Normile | H04N 19/156 341/50 |
| 2010/0080290 | A1* | 4/2010 | Mehrotra | H04N 19/147 375/240.07 |
| 2010/0128770 | A1* | 5/2010 | Stanciu | H04L 12/2697 375/228 |
| 2012/0288013 | A1* | 11/2012 | Pahalawatta et al. | 375/240.25 |
| 2013/0222539 | A1* | 8/2013 | Pahalawatta et al. | 348/43 |

OTHER PUBLICATIONS

Borcoci et al. "A Novel Architecture for Multimedia Distribution based on Content-Aware Networking". (Jun. 2010) 3rd Inter. Conf. on Com. Theory, Reliability and Quality of Service.*

Christian Trimmerer, et al., "Media-Aware Network Elements on Legacy Devices," *ISO/IEC JTC 1/SC 29/WG 11/M16695*, 89th MPEG Meeting, London, UK, Jun. 2009; © Copyright: Christian Trimmerer. Jul. 1, 2009; http://www.slideshare.net/christian.timmerer/mediaaware-network-elements-on-legacy-devices; 16 pages.

Nicolas Tizon, et al., "Scalable and Media Aware Adaptive Video Streaming Over Wireless Networks," Hindawi Publishing Company, EURASIP Journal on Advances in Signal Processing; vol. 2008, Article ID 218046; received Sep. 29, 2007; accepted May 6, 2008; http://www.eurasip.org/; 12 pages.

S. Wenger, et al., "RTP Payload Format for H.264 Video," Network Working Group, RFC 3984, Feb. 2005; http://www.rfc-editor.org/rfc/rfc3984.txt; 92 pages.

* cited by examiner

FIG. 5

| | | |
|---|---|---|
| TAG_DOWNSCALED | VALUE = 0 OR 1 | SPECIFIES WHETHER DOWNSCALING WAS PERFORMED ON THE VIDEO SEQUENCE |
| TAG_FILTERED | VALUE = 0 OR 1 | SPECIFIES WHETHER A NOISE/ENHANCEMENT FILTER WAS APPLIED TO THE VIDEO SEQUENCE |
| TAG_FILTER_TYPE | VALUE = {NOISE, ENHANCEMENT, LOWPASS, SHARPENING, ETC.} | SPECIFIES THE FILTER TYPE APPLIED TO VIDEO SEQUENCE |
| TAG_PSNRD | VALUE = {:PSNR DIFFERENCE BETWEEN INCOMING VIDEO SEQUENCE AND OUTGOING VIDEO SEQUENCE} | |
| TAG_NUM_TRANSCODINGS | VALUE = {INTEGER FROM 0-255} | SPECIFIES NUMBER OF TRANSCODINGS THAT HAVE OCCURRED. THIS VALUE WOULD BE INCREMENTED EACH TIME A MANE PERFORMS A TRANSCODING |
| TAG_CUR_JITTER | VALUE = {INTEGER FROM 0-255 THAT MAPS TO A PRE-DEFINED JITTER RANGE} | THIS VALUE WOULD BE MODIFIED BY EACH MANE TO ACCOUNT FOR THE JITTER INTRODUCED BETWEEN ITSELF AND THE PREVIOUS DEVICE |
| TAG_CUR_DELAY | VALUE = {INTEGER FROM 0-255 THAT MAPS TO A PRE-DEFINED DELAY RANGE} | THIS VALUE WOULD BE MODIFIED BY EACH MANE TO ACCOUNT FOR THE DELAY INTRODUCED BETWEEN ITSELF AND THE PREVIOUS DEVICE |
| TAG_JITTER_THRESHOLD | VALUE = {INTEGER FROM 0-255 THAT MAPS TO A PRE-DEFINED JITTER RANGE} | SET BY ENDPOINTS TO SPECIFY AN ACCEPTABLE JITTER THRESHOLD. MAY BE USED BY MANEs TO DROP PACKETS THAT EXCEED THRESHOLD |
| TAG_DELAY_THRESHOLD | VALUE = {INTEGER FROM 0-255 THAT MAPS TO A PRE-DEFINED DELAY RANGE} | SET BY ENDPOINTS TO SPECIFY AN ACCEPTABLE DELAY THRESHOLD. MAY BE USED BY MANEs TO DROP PACKETS THAT EXCEED THRESHOLD |
| TAG_GAMMA_TRANSMIT | VALUE = {INTEGER FROM 0-255 THAT MAPS TO A PRE-DEFINED GAMMA RANGE} | SPECIFIES THE TRANSMITTER GAMMA AND MAY BE USED BY A MANE OR ENDPOINT TO PERFORM COLOR CORRECTION/CONTRAST ENHANCEMENT |
| TAG_GAMMA_RECEIVE | VALUE = {INTEGER FROM 0-255 THAT MAPS TO A PRE-DEFINED GAMMA RANGE} | SPECIFIES THE RECEIVER GAMMA AND MAY BE USED BY A MANE OR ENDPOINT TO PERFORM COLOR CORRECTION/ CONTRAST ENHANCEMENT |
| TAG_END | | SPECIFIES END OF LIST |

SYSTEM AND METHOD FOR MANAGING VIDEO PROCESSING IN A NETWORK ENVIRONMENT

TECHNICAL FIELD

This disclosure relates in general to the field of communications, and more particularly, to a system and a method for managing video processing in a network environment.

BACKGROUND

Networking architectures have grown increasingly complex in communications environments. Data traffic has grown extensively in recent years, which has significantly increased the demands on network resources and devices. Video traffic has added a layer of complexity to processing in the network. As the subscriber base of end users increases, efficient management of communication resources becomes even more critical. In some instances, redundant processing may cause network equipment to become unnecessarily overwhelmed, provide suboptimal performance, or inhibit the delivery of video data. Hence, there is a challenge in managing video data processing in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified diagram illustrating possible example tags associated with the communication system.

DETAILED DESCRIPTION OF EXAMPLE EMBODIMENTS

Overview

A method is provided in one example embodiment and includes establishing a communication channel between a first network element and a second network element; identifying a video processing characteristic for a data stream in a network environment; embedding a plurality of bits into the data stream in order to identify the video processing characteristic that has been identified by the first network element; and communicating the data stream with the plurality of bits to a next destination.

In more specific implementations, the communication channel is associated with a H.264 protocol. In addition, the embedding of the plurality of bits into the data stream can be performed during an encoding activity at the first network element in which the plurality of bits are embedded within one or more macro-blocks of a video frame. The plurality of bits can be associated with a distribution of a processing load between the first network element and the second network element for the data stream, where the next destination decodes the plurality of bits from the data stream in order to identify the video processing characteristic. The video processing characteristic can be associated with a gamma correction for the data stream; a color correction for the data stream; a noise filtering for the data stream; an upscaling activity for the data stream; a downscaling activity for the data stream, etc.

In yet other embodiments, the first network element is configured to calculate a metric differential that results from a transrating activity associated with the data stream. The metric differential can be associated with a peak signal-to-noise ratio (PSNR) or a structural similarity (SSIM), where the metric differential is included within the plurality of bits. Additionally, the plurality of bits identifies jitter or delay associated with the data stream.

Example Embodiments

Figure 1A:
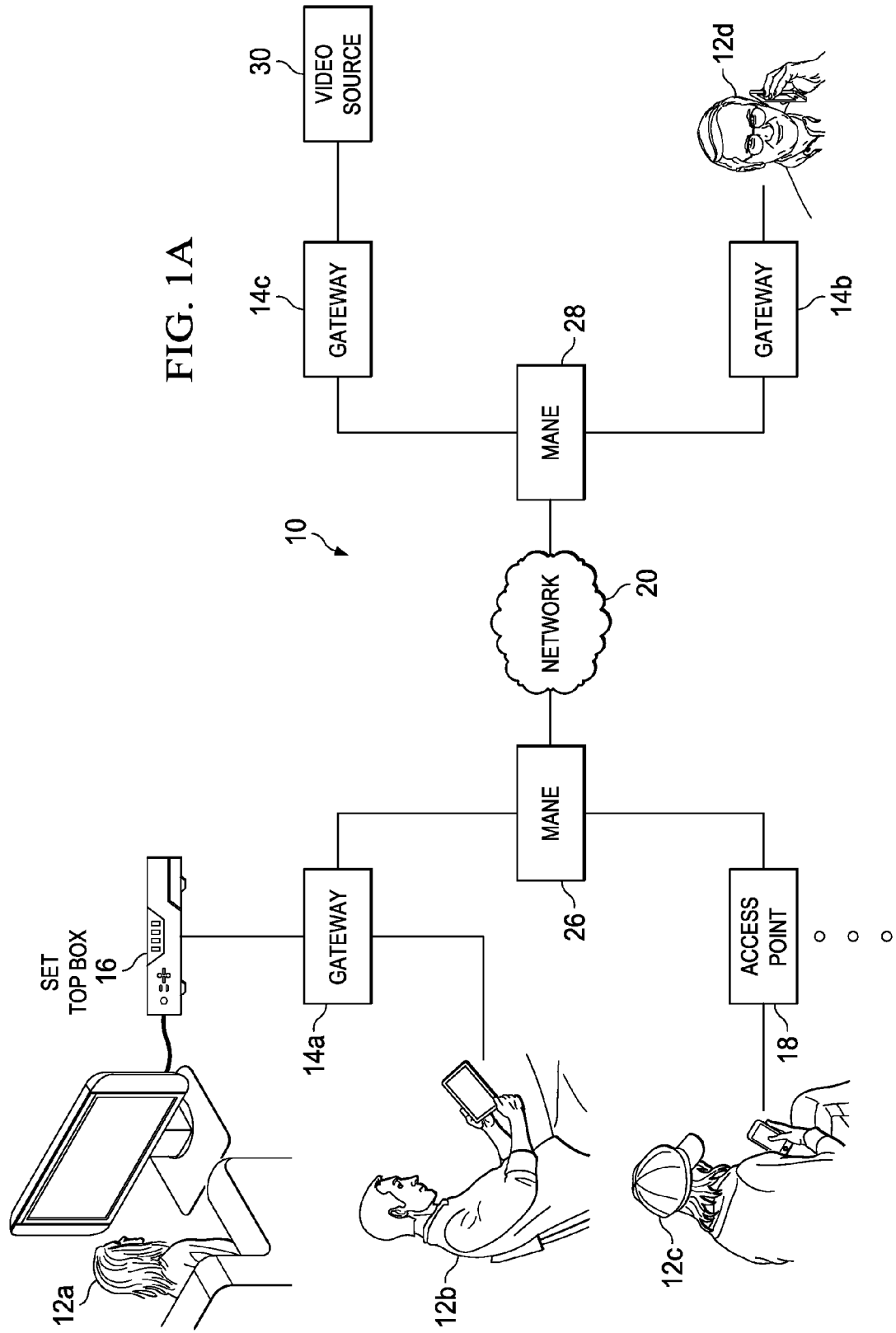
FIG. 1A is a simplified block diagram illustrating a communication system for managing video processing in a network environment according to one embodiment of the present disclosure.

Turning to FIG. 1A, FIG. 1A is a simplified block diagram of a communication system 10 for managing video processing in a network environment. In this particular example, FIG. 1A includes multiple video endpoints 12a-d, multiple gateways 14a-c, a set-top box 16, an access point 18, and a network 20. Network 20 can serve as a transport mechanism for data that propagates between multiple media aware network elements (MANEs) 26 and 28. Additionally, communication system 10 includes a video source 30, which may provide any suitable content being sought by video endpoints 12a-d.

Each of the elements of FIG. 1A may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Before detailing the operations and the infrastructure of FIG. 1A, certain contextual information is provided to offer an overview of some problems that may be encountered while managing video processing in a network environment. Such information is offered earnestly and for teaching purposes only and, therefore, should not be construed in any way to limit the broad applications for the present disclosure.

There are two significant problems encountered in current video processing scenarios in the network. The first problem relates to end-to-end video monitoring. The network infrastructure does not support the notion of parsing/editing video quality, nor does it foster the propagation of transport statistics for a video stream. One of the barriers in supporting video quality statistics that are to be associated with a video stream is that a viable communication channel should exist (and a protocol established) to support such communications.

The second problem is the lack of efficient distributed processing on video streams within the network. In common networking scenarios, several MANEs perform transcoding, video processing, video quality measurement, etc. between the video endpoints. As MANEs become more prevalent in the network, it is important for the MANEs to establish an intra-communication channel between them such that they can communicate the video processing tasks that can be distributed across the MANEs. It should also be noted that video endpoints typically experience redundant processing. This redundant processing is not only inefficient, but it can inhibit video quality (e.g., increased latency). This becomes increasingly apparent as new devices are inserted in the network between the video endpoints.

In accordance with one embodiment, communication system 10 can overcome the aforementioned shortcomings (and others) by providing a communication protocol that is transparent to an associated application, and that affords improved video quality for flows propagating in the network. Additionally, the communication protocol can support the propagation of transport statistics for network elements, along with video processing information that can be directly embedded into a compressed bit stream. Certain example embodiments presented herein can leverage the H.264 compression standard as a mechanism for propagating this important data. It is imperative to note that the H.264 mechanism is merely an example, as the present disclosure is not so limited to this H.264 protocol.

Note that the protocol described herein enables optimal video quality and transport monitoring to occur in a network (in addition to distributed video processing) without requiring an explicit communication channel. In particular, video endpoints and network elements that are not capable of decoding the information, which is embedded in the compressed bit stream, would not be affected by the existence of this information. Conversely, the video endpoints and network elements that are aware of the embedded information may make use of the information to improve and/or to monitor the video quality. Furthermore, the information that is embedded in the bit stream would not detract from the video quality, nor add noticeable overhead to the existing bitrate of the bit stream.

Consider an example scenario in which both MANEs perform transrating and, as a result, affect the video quality of data propagating between endpoints. In this case, it may be useful for the video endpoint to be notified of the number of transratings that have occurred in addition to a quality differential that results from the transratings. The first MANE (e.g., MANE 26) may calculate the quality metric differential (e.g., peak signal-to-noise ratio (PSNR), structural similarity (SSIM), mean squared error (MSE), etc.) that results from the transrating. This metric can be directly embedded into the compressed bit stream using the techniques described in this disclosure. The second MANE (e.g., MANE 28) may perform a similar embedding into the bit stream. The video endpoint, if it is aware of these embeddings, may extract the quality differentials and calculate the end-to-end quality differential that results from transrating. The video endpoint may then utilize this quality differential to decide whether to renegotiate the call bandwidth.

In a second example scenario, consider the case where the two video endpoints have display and capture gamma characteristics that do not match. In this case, a video endpoint may embed the gamma characteristic into the compressed bit stream, and one of the MANEs (or the other video endpoint) may extract the gamma values from each endpoint and perform an appropriate color/contrast correction to the video sequence. In another instance, the first MANE may directly estimate the gamma mismatch if it is not sent from the endpoints, and either use this value to perform the color/contrast correction or pass this value to another MANE to perform the contrast/color correction.

In a third example scenario, consider a case where each MANE may perform a video processing functionality. In such an instance, it may be beneficial for the MANEs to distribute the processing load. In order for this to occur effectively, the communication protocol between the MANEs (as outlined herein) can be leveraged in order to distribute the processing load. Moreover, the techniques described in this disclosure allow for the communication to occur transparently.

In a fourth example scenario, consider another instance in which the video endpoint or MANE performs a downscaling or upscaling, where a MANE or a video endpoint that is further along in the network pathway also needs to perform a downscaling or an upscaling activity. In such a case, the video quality can be improved if the filter taps are exchanged between the MANEs and the video endpoints. This would allow the taps to be intelligently selected to maximize the video quality.

In a fifth example scenario, consider an environment in which the video endpoint has a strict jitter or delay constraint. This constraint may be suitably embedded in the compressed stream using the communication protocol outlined herein. The MANEs that perform possible transcoding/transrating may calculate intermediate jitter and delay values between itself and the previous device and, further, may embed this value into the compressed stream. The MANE may also determine if the current jitter or delay value exceeds the threshold specified by the endpoint and, subsequently, drop frames accordingly in order to improve the end-to-end throughput.

Hence, there is a multitude of example scenarios in which the present disclosure would add significant value. The above examples are simply reflective of some of the many example scenarios in which communication system 10 would be applicable for video quality monitoring and improvement. These examples have a commonality in which a suitable communication protocol is being established between network elements (where this term includes video endpoints), as being discussed herein. Furthermore, such a protocol is transparent to network devices that are unaware of the protocol. Additionally, the signaling mechanism being discussed in the example embodiments herein does not impact video quality or bitrate and, further, offers negligible signaling overhead between network elements. Before turning to additional capabilities and features of the present disclosure, the infrastructure of FIG. 1A is discussed.

Returning to FIG. 1A, MANEs 26 and 28 are network elements (e.g., a middlebox, an application layer gateway, etc.) that can be configured for parsing certain aspects of the real-time protocol (RTP) payload headers (or the RTP payload). MANEs 26 and 28 can also be configured to react to the contents of these headers and payloads. More generally, MANEs 26 and 28 can (in certain instances) be aware of the signaling (e.g., to learn about the payload type mappings of the media streams), and operate in conjunction with a secure real-time transport protocol (SRTP). One advantage of using MANEs is that they can allow packets to be dropped according to the needs of the media coding. For example, if a MANE is forced to drop packets due to congestion on a certain link, it can identify those packets whose dropping has the smallest negative impact on the user experience, and remove them in order to remove the congestion and/or minimize the delay.

In a particular embodiment, MANEs 26 and 28 are media engine elements configured to coordinate certain video processing activities in a network environment. More generally, MANEs 26 and 28 are network elements that are meant to encompass network appliances, servers, media engine elements, middleboxes, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

MANEs 26 and 28 can perform video processing (potentially inclusive of distributed processing) in certain example implementations. Additionally, MANEs 26 and 28 can coordinate certain processing activities such that one MANE can perform one type of video processing (e.g., gamma correction), whereas its counterpart could perform other types of video processing (e.g., color/contrast correction).

Video endpoints 12a-d are representative of devices used to initiate communications in a network environment. Note that any type of client or customer wishing to initiate a flow can leverage the capabilities of communication system 10. Video endpoints 12a-d encompass terms 'user equipment', 'mobile node', 'end user', 'and 'subscriber' are inclusive of devices used to initiate a communication in the network of communication system 10 and include items such as a computer, a personal digital assistant (PDA), a laptop or electronic notebook, a high definition television, a videoconferencing platform, a Telepresence device (or Webcam), a cellular telephone, an i-Phone, i-Pad, a Google Droid phone, an IP phone, or any other device, component, element, or object capable of initiating voice, audio, video, media, or data exchanges within communication system 10. This may also be inclusive of a suitable interface to the human user such as a microphone, a display, a keyboard, or other terminal equipment.

Video endpoints 12a-d may also be representative of any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Gateways 14a-d and access point 18 are simply devices capable of data propagation and/or providing (or fostering) network connectivity for video endpoints. Gateways 14a-d and access point 18 may couple directly, or indirectly, to a respective MANE 26 or 28. In a generic sense, gateways 14a-d and access point 18 are representative of infrastructure that facilitates video flows in a network environment. For example, gateway 14c may interface with a suitable video source 30 in order to retrieve information being requested by video endpoint 12c.

Figure 1B:
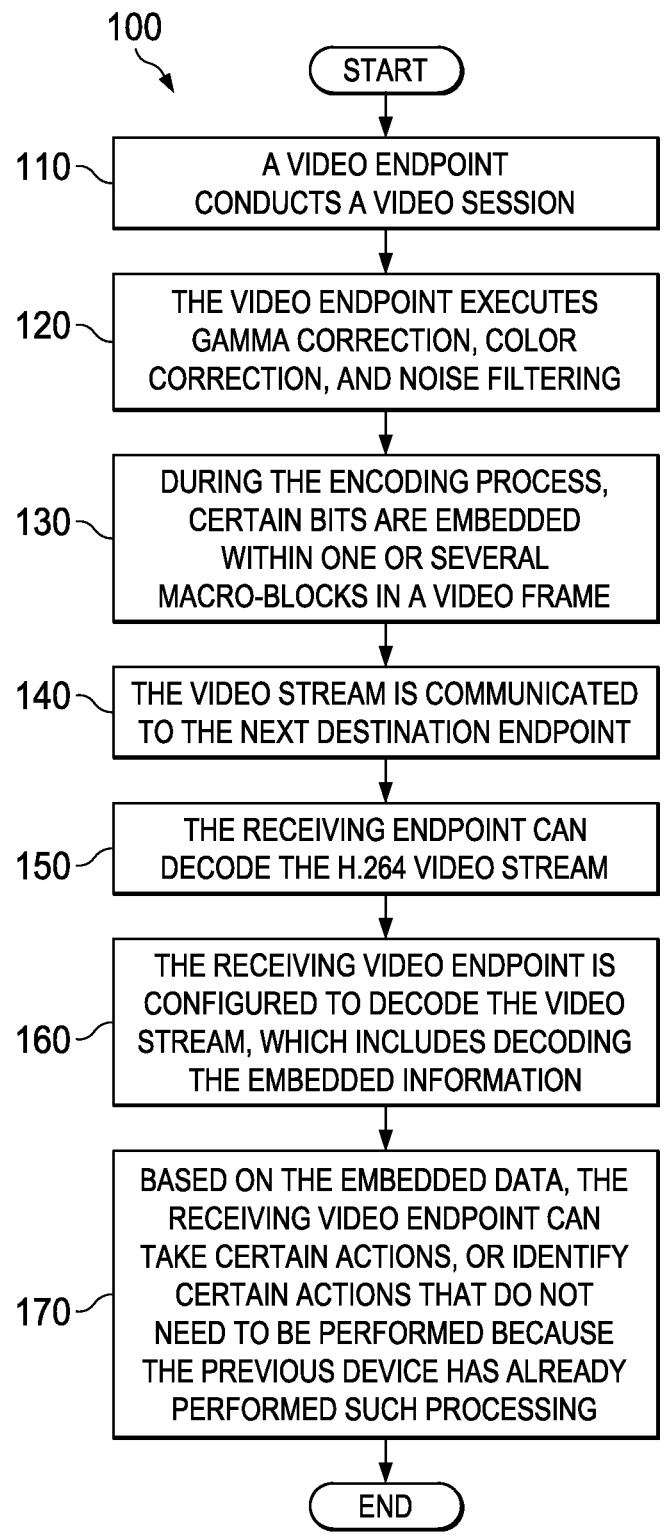
FIG. 1B is a simplified flowchart illustrating one possible operational flow associated with the communication system.

Turning to FIG. 1B, FIG. 1B is a simplified flowchart 100 illustrating an example activity associated with the present disclosure. This particular flow may begin at 110, where a given video endpoint (e.g., an iPhone) is conducting a video session. At 120, the video endpoint executes gamma correction, color correction, and noise filtering. Note that such video processing can be executed by any suitable element such as MANEs 26 and 28, or any other suitable video processing element in the network pathway for this video session.

In order to eliminate redundant processing, the video endpoint seeks to inform the next endpoint (downstream) of the video processing that has previously occurred. In this particular instance, the H.264 protocol can be used to embed certain information into this compression signaling. At 130, during the encoding process, certain bits are embedded within one or several macro-blocks in a video frame (e.g., the first frame suitably propagating to the next endpoint).

At 140, the video stream is communicated to the next destination endpoint. The receiving endpoint can decode the H.264 video stream at 150. If the video endpoint is unaware of the protocol disclosed herein, then this particular video endpoint could simply decode this video stream as a regular H.264 flow and either pass it along, or render it on a suitable video screen. In cases where the receiving video endpoint is aware of the protocol being described herein, it can be configured to decode the video stream, which includes decoding the embedded information at 160.

Based on the embedded data, the receiving video endpoint can take certain actions, or (just as importantly) identify certain actions that do not need to be performed because the previous device has already performed such processing. This is illustrated at 170. It should be noted that any network element on this network path can decode this embedded data and perform appropriate actions, or recognize that certain actions do not need to be performed based on previous processing, which is being signaled by the embedded information.

Figure 2:
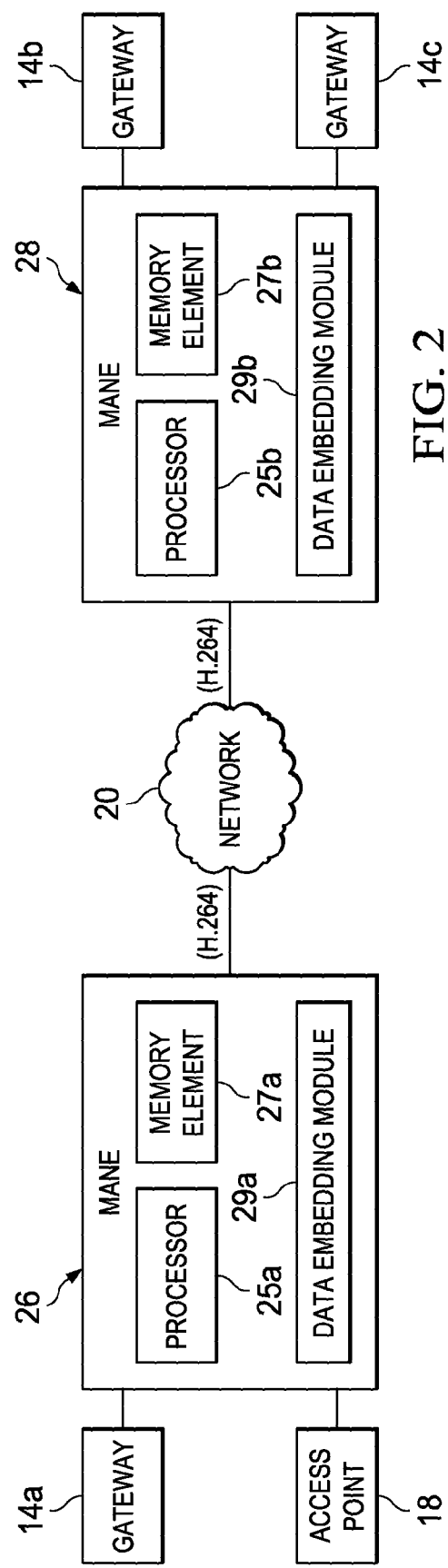
FIG. 2 is a simplified block diagram illustrating additional details associated with one potential embodiment of the communication system.

Referring now to FIG. 2, FIG. 2 is a simplified block diagram illustrating potential details associated with communication system 10. In this example configuration, each MANE 26 and 28 include a respective processor 25a-b, a memory element 27a-b, and a data embedding module 29a-b. In the particular example of FIG. 2, the H.264 protocol is being used as a signaling mechanism between MANEs 26 and 28. Alternatively, any suitable protocol may be substituted in its place and, therefore, such substitutions would apply equally to the teachings of the present disclosure. For example, compression standards such as H.263 (e.g., for videoconferencing, video telephony, video on mobile phones (3GP), etc.), MPEG-4 Part (e.g., for Internet video), MPEG-4 (e.g., for Blu-ray, digital video broadcasting, iPod video, HD DVD) can readily be used in accordance with the teachings of the present disclosure.

In one particular example, the architecture of the present disclosure can hide bits within the H.264 protocol without degrading video quality. The signaling can indicate that, for example, gamma correction or color correction/contrast has already been performed on a particular video segment. Hence, the next hop in the network would not need to perform these operations and, therefore, would not incur redundant processing. Furthermore, other types of communications can leverage this protocol to send different types of network characteristic data through the architecture.

For example, network characteristics such as latency could be communicated for particular video segments in order to ensure a certain quality of service (QoS) is achieved for particular flows. In other examples, certain frames could be dropped if the latency exceeded a certain threshold. In still other examples, information relating to elements such as jitter, packet loss, noise, interference, etc. can be sent through the network using such a protocol. Note that the underlying application can be unaware of the signaling information.

Hence, appropriate software and/or hardware can be provisioned in MANEs 26 and 28 in order to facilitate the video processing management activities discussed herein. A single instance of the MANE may be provisioned in a given network scenario to achieve the teachings of the present disclosure, or multiple instances of this element may be provisioned based on the particular use case. Alternatively, such a mechanism can be provisioned in any of the other elements of FIG. 1A. Such provisioning may be based on particular operator constraints, particular networking environments, specific types of streaming data, and/or specific protocol parameters. Note that in certain examples, certain databases can be consolidated with memory elements (or vice versa), or the storage mechanisms of the present disclosure can overlap/exist in any other suitable manner.

In regards to the internal structure associated with communication system 10, each of MANEs 26 and 28 can include memory elements for storing information to be used in achieving the video processing management operations, as outlined herein. Additionally, each of these devices may include a processor that can execute software or an algorithm to perform the video processing management activities discussed herein. These devices may further keep information in any suitable memory element [(e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element.' The information being tracked or sent by MANEs 26 and 28 could be provided in any database, queue, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements and user equipment (e.g., mobile nodes) can also include suitable interfaces for receiving, transmitting, and/or otherwise communicating data or information in a network environment.

In one example implementation, each of MANEs 26 and 28 include software (e.g., as part of data embedding modules 29a-b, etc.) to achieve, or to foster, the video processing management operations, as outlined herein. In other embodiments, this feature may be provided externally to these elements, or included in some other network device to achieve this intended functionality. Alternatively, these elements can include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the video processing management functions outlined herein may be implemented by logic encoded in one or more tangible media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
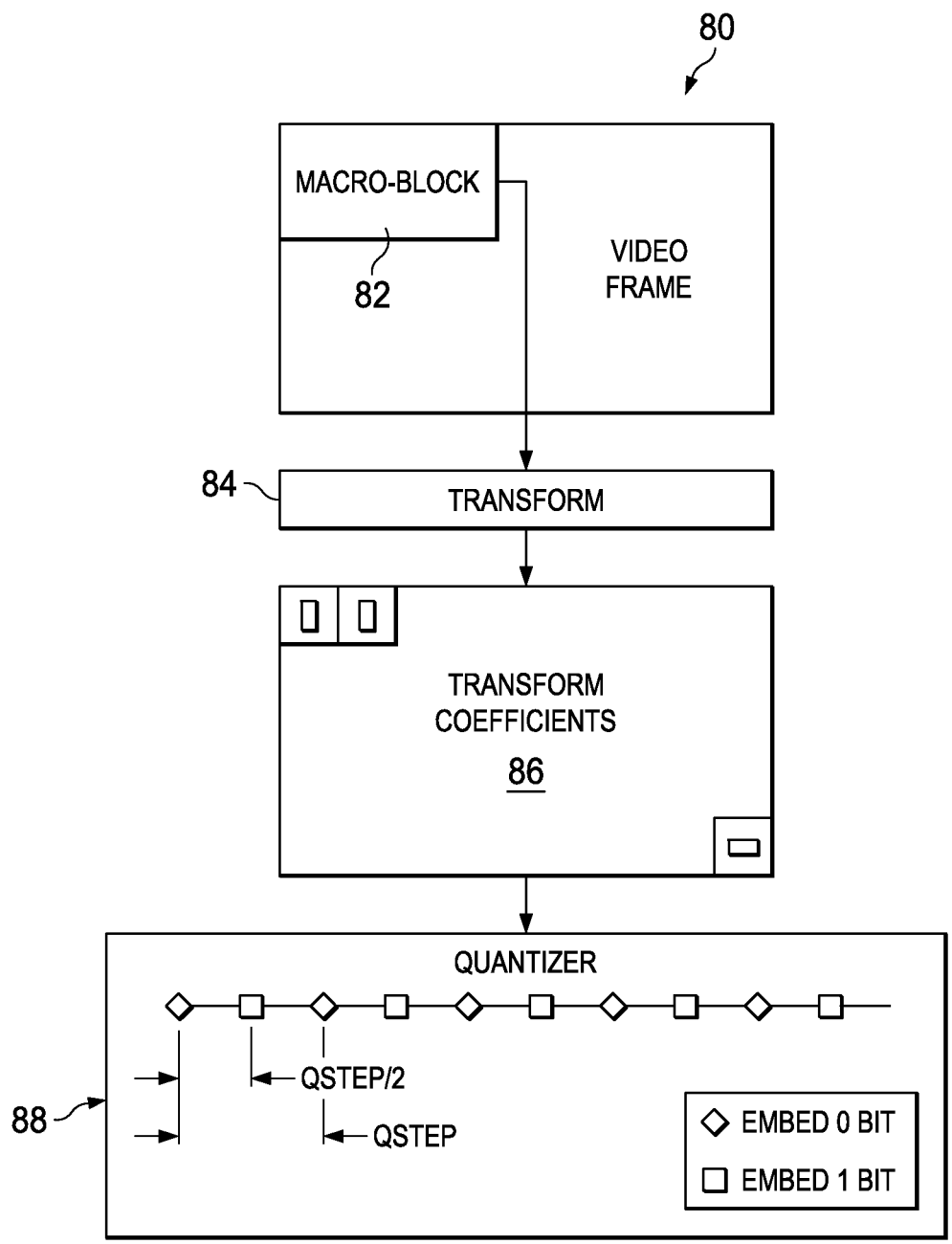
FIG. 3 is another simplified block diagram illustrating one possible implementation associated with the communication system.
Figure 4:
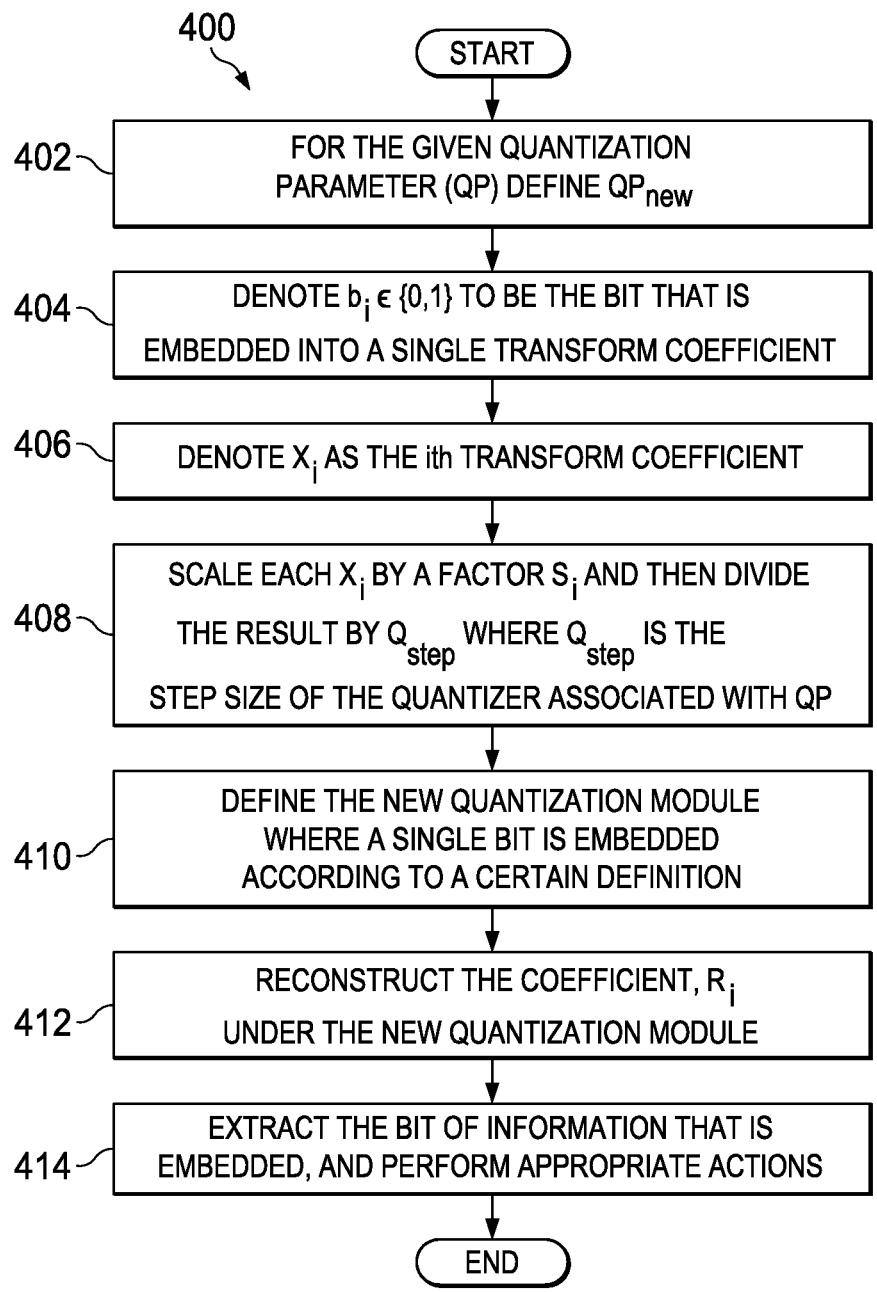
FIG. 4 is a simplified flowchart illustrating one possible operational flow associated with the communication system.

FIG. 3 is a simplified block diagram illustrating an example architecture 80 associated with certain embedding activities relating to communication system 10. FIG. 4 is a flowchart 400 illustrating activities that can be performed by communication system 10. Because of their relationship, these two FIGURES are discussed together. Turning first to the infrastructure of FIG. 3, FIG. 3 illustrates a video frame in which a macro-block 82 is present. Additionally, FIG. 3 illustrates a transform element 84, a transform coefficient segment 86, and a quantizer 88 that depicts activities associated with embedding a zero bit and a one bit, which is further detailed below.

In operation, the initial segment of the protocol addresses the establishment of a communication channel. The communication channel can be established directly in the compressed bit stream without affecting the compliance of the bit stream, or the quality of the video that results from decoding the bit stream. In practical terms, the communication protocol is lightweight so there is insignificant bitrate overhead for utilizing this protocol (e.g., a few bytes per frame). In this example of FIG. 3, the H.264 standard is leveraged for establishing the communication directly in the bit stream. In the H.264 standard, a video frame can be divided into 16×16 macro-blocks, where each 16×16 macro-block can be further divided into 4×4 sub-blocks, which are then transformed and quantized. After the transform step (i.e., transform element 84), there would be 16 transform coefficients per 4×4 sub-block. A single bit of information may be embedded into each transform coefficient.

Now referencing FIG. 4, this particular flow may begin at 402 in which, for a given quantization parameter (QP) of the macro-block that may be calculated from a rate control module, a $QP_{new}$ is defined. This $QP_{new}$ can have a step size that is one-half the step size of the QP. At 404, the system can denote $b_i \in \{0,1\}$ to be the bit that is embedded into a single transform coefficient. At 406, the system is configured to denote $X_i$ as the ith transform coefficient.

At 408, quantization for H.264 can include scaling each $X_i$ by a factor $S_i$ and then dividing the result by $Q_{step}$, where $Q_{step}$ is the step size of the quantizer associated with QP. The equation would be provided as:

$$Q[X_i] = \left\lfloor \frac{S_i X_i + Q_{step}/2}{Q_{step}} \right\rfloor$$

where the floor function, $\lfloor \; \rfloor$, can be defined to round toward the smallest integer, in certain example implementations.

At 410, a new quantization segment can be defined, where a single bit is embedded as follows:

$$Q_{new}[X_i] = \left\lfloor \frac{S_i X_i + \frac{b_i * Q_{step}}{2}}{Q_{step}} \right\rfloor * 2 + b_i$$

Note that $Q_{step}/2$ corresponds to the step size of $QP_{new}$. The above equation can result in a quantized coefficient that falls on the quantizer grid of $QP_{new}$. The quantizer that can be specified in the H.264 syntax for the given macro-block is $QP_{new}$. At 412, to reconstruct the coefficient $R_i$ under the new quantization module, the following equation can be used:

$$R_i = Q_{new}[X_i] * Q_{step}/2$$

To extract the bit of information that is embedded, at 414, the following equation be used:

$$b_i = Q_{new}[X_i] \text{ modulo } 2$$

It should be noted that the effective quantizer step size that is used is $Q_{step}$ even though the $QP_{new}$ that is specified for the macroblock corresponds to a step size of $Q_{step}/2$. As a result, the distortion that results from quantization can be the same as that of using a quantization parameter of QP (e.g., instead of $QP_{new}$), and the video quality can be the same as the video quality that would result from using quantization parameter QP. Furthermore, note that one bit can be embedded in each transform coefficient. In a 16×16 macro-block, there are 256 transform coefficients and, as a result, 256 bits or 32 bytes of information may be embedded in a given macro-block without sacrificing video quality.

For example, referring back to FIG. 3, 256 transform coefficients can be sent to a quantizer. The quantizer may be representative of reconstruction points, which are depicted by diamonds and squares. Given that a zero is to be embedded, then the subset of reconstruction points that correspond to the diamonds are used to quantize the coefficient. Similarly, if a one is to be embedded, then the subset of reconstruction points that correspond to the squares can be used to quantize the coefficient. Note that the distance between either the diamonds or the squares is $Q_{step}$ in this particular example. This can ensure that the distortion that results from embedding a single bit would be approximately the same as quantizing with a quantizer (which has a step size of $Q_{step}$), and, therefore, no additional distortion would result from embedding a bit.

Logistically, and in the context of an example implementation, the architecture can use two macro-blocks for embedding 64 bytes of information. The first macro-block can contain a unique 32-byte key, which can be agreed upon by parties that are using the communication protocol to establish whether meaningful bytes are present in a second macro-block. If the 32-byte key is present in the first macro-block, then 32 bytes can be extracted/embedded from/to the second macro-block to signal (to other devices) that a particular monitoring/processing that should be performed.

The pairs (e.g., TAG, VALUE pairs) may be used to signal the presence and content of information. The TAG can be an 8-byte unique tag, which specifies the presence of information, where the VALUE associated with the TAG can indicate the actual value of the information. A unique TAG can be used to specify the end of the information. As a result, TAGs can be parsed until the unique end TAG is reached, which can trigger a signal that the end has been reached (i.e., there is no more information).

Some of the possible TAG, VALUE pairs are illustrated in FIG. 5, which is a simplified diagram illustrating a set of example TAG/VALUE pairs 95 that could be useful in the context of the above example scenarios. As is being shown in FIG. 5, the pairs can include segments associated with downscaling, noise/enhancement filtering, filter type, PSNR, transcoding, jitter (inclusive of threshold and a predefined range), delay (inclusive of threshold and a predefined range), gamma (inclusive of threshold and a predefined range), a tag end that specifies the end of list, etc. Other TAG, VALUE pairs could be associated with SSIM, MSE, or any other suitable video processing aspect, network characteristics, link parameters, etc. As used herein in this Specification, the term "video processing characteristic" is meant to include all such elements (e.g., video processing tasks, network characteristics, link parameters, transrating, gamma activities, color/contrast activities, jitter characteristics, delay characteristics, interference characteristics, noise characteristics, QoS characteristics, bandwidth characteristics, latency parameters, filtering activities, distributed load activities, upscaling operations, downscaling operations) or any other suitable video processing characteristic, which may be based on particular configuration needs, specific network designs, individualized operator constraints, etc.

It is imperative to note that the illustrated tags of FIG. 5 are simply being discussed as possible examples of tags that may be useful in video endpoint contexts and/or MANE activities. These particular tags may be related to improving/monitoring video quality associated with network elements. In other instances, different tags can be used, or any hybrid or modification to the discussed tags may be provisioned. Accordingly, this listing may certainly be extended based on particular needs, or specific architecture configurations. The above tags that are mentioned are examples of elements that may be useful to video endpoints and/or MANEs for improving/monitoring video quality. The list may be easily extended as necessary.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Additionally, although described with reference to particular scenarios, where an embedding module (e.g., data embedding modules 29a-b) is provided within the network elements, these modules can be provided externally, or consolidated and/or combined in any suitable fashion. In certain instances, the data embedding module may be provided in a single proprietary element, device, unit, etc. Additionally, the teachings of the present disclosure are not simply applicable to video processing contexts. Instead, communication system 10 can readily be used by any protocol in which certain types of processing is being performed along a given network pathway. Moreover, the teachings of the present disclosure are readily applicable to long-term evolution (LTE) configurations, WiMAX, code division multiple access (CDMA), Femto configurations, WiFi, or any other suitable architecture in which similar video processing scenarios would be present.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method to be performed by a first network element associated with a video session, the method comprising:
    encoding a data stream associated with the video session;
    during the encoding, embedding video quality and/or video transport characteristic bits into the encoded data stream, wherein the video quality and/or video transport characteristic bits identify video processing tasks applied to the data stream and/or video processing transport information that affect the video quality of the data stream; and
    communicating the encoded data stream with the video quality and/or video transport characteristic bits to a second network element associated with the video session, wherein the second network element decodes the video quality and/or video transport characteristic bits and determines what video processing tasks to apply to the decoded data stream based on the video quality and/or video transport characteristic bits, wherein the video quality and/or video transport characteristic bits are embedded within transform coefficients of one or more macro-blocks of a video frame and the video quality and/or video transport characteristic bits form (TAG, VALUE) pairs, wherein the TAG signals video quality and/or video transport information and the VALUE specifies a value for the video quality and/or video transport information;

wherein the (TAG, VALUE) pairs identify one or more of the following:
    a) a gamma characteristic that the second network element can use in performing a color correction and/or color enhancement on the data stream;
    b) a transcoding characteristic specifying information associated with transcoding that has been applied to the data stream;
    c) a filter characteristic specifying information associated with noise filtering that has been applied to the data stream; and
    d) a scaling characteristic specifying information associated with an upscaling and/or a downscaling activity that has been applied to the data stream.

2. The method of claim 1, wherein one video quality and/or video transport characteristic bit is embedded within each transform coefficient.

3. The method of claim 2, wherein the video quality and/or video transport characteristic bits embedded in a first macro-block of the video frame form a unique key that notifies the second network element that meaningful video quality and/or video transport characteristic bits are present in a second macro-block of the video frame.

4. The method of claim 1, wherein the video quality and/or video transport characteristic bits indicate a video processing task that has been performed on the data stream by the first network element, such that the second network element knows not to perform the indicated video processing task on the data stream.

5. The method of claim 1, further comprising:
    calculating a quality metric differential that results from a transrating activity associated with the data stream, wherein the video quality and/or video transport characteristic bits embedded in the encoded data stream identify the quality metric differential.

6. The method of claim 1, wherein the video quality and/or video transport characteristic bits embedded in the encoded data stream identify a jitter or delay associated with the data stream.

7. A non-transitory media encoded with logic that includes code for execution and when executed by a processor operable to perform operations comprising:
    encoding a data stream associated with the video session;
    during the encoding, embedding video quality and/or video transport characteristic bits into the encoded data stream, wherein the video quality and/or video transport characteristic bits identify video processing tasks applied to the data stream and/or video processing transport information that affect the video quality of the data stream; and
    communicating the encoded data stream with the video quality and/or video transport characteristic bits to a second network element associated with the video session, wherein the second network element decodes the video quality and/or video transport characteristic bits and determines what video processing tasks to apply to the decoded data stream based on the video quality and/or video transport characteristic bits, wherein the video quality and/or video transport characteristic bits are embedded within transform coefficients of one or more macro-blocks of a video frame and the video quality and/or video transport characteristic bits form (TAG, VALUE) pairs, wherein the TAG signals video quality and/or video transport information and the VALUE specifies a value for the video quality and/or video transport information;

wherein the (TAG, VALUE) pairs identify one or more of the following:
  a) a gamma characteristic that the second network element can use in performing a color correction and/or color enhancement on the data stream;
  b) a transcoding characteristic specifying information associated with transcoding that has been applied to the data stream;
  c) a filter characteristic specifying information associated with noise filtering that has been applied to the data stream; and
  d) a scaling characteristic specifying information associated with an upscaling and/or a downscaling activity that has been applied to the data stream.

8. The non-transitory media of claim 7, wherein one video quality and/or video transport characteristic bit is embedded within each transform coefficient.

9. The non-transitory media of claim 7, wherein the video quality and/or video transport characteristic bits embedded in a first macro-block of the video frame form a unique key that notifies the second network element that meaningful video quality and/or video transport characteristic bits are present in a second macro-block of the video frame.

10. The non-transitory media of claim 7, wherein the video quality and/or video transport characteristic bits indicate a specific video processing task performed on the data stream by the first network element, such that the second network element knows not to perform the specific video processing task on the data stream.

11. The logic of claim 7, further comprising calculating a quality metric differential that results from a transrating activity associated with the data stream, wherein the video quality and/or video transport characteristic bits embedded in the encoded data stream identify the quality metric differential.

12. The non-transitory media of claim 7, wherein the video quality and/or video transport characteristic bits embedded in the encoded data stream identify a jitter or delay associated with the data stream.

13. An apparatus, comprising:
  a memory element configured to store electronic code;
  a processor operable to execute instructions associated with the electronic code; and
  a data embedding module configured to interface with the processor, such that the apparatus is configured for:
    encoding a data stream associated with the video session;
    during the encoding, embedding video quality and/or video transport characteristic bits into the encoded data stream, wherein the video quality and/or video transport characteristic bits identify video processing tasks applied to the data stream and/or video processing transport information that affect the video quality of the data stream; and
    communicating the encoded data stream with the video quality and/or video transport characteristic bits to a second network element associated with the video session, wherein the second network element decodes the video quality and/or video transport characteristic bits and determines what video processing tasks to apply to the decoded data stream based on the video quality and/or video transport characteristic bits, wherein the video quality and/or video transport characteristic bits are embedded within transform coefficients of one or more macro-blocks of a video frame and the video quality and/or video transport characteristic bits form (TAG, VALUE) pairs, wherein the TAG signals video quality and/or video transport information and the VALUE specifies a value for the video quality and/or video transport information;
  wherein the (TAG, VALUE) pairs identify one or more of the following:
    a) a gamma characteristic that the second network element can use in performing a color correction and/or color enhancement on the data stream;
    b) a transcoding characteristic specifying information associated with transcoding that has been applied to the data stream;
    c) a filter characteristic specifying information associated with noise filtering that has been applied to the data stream; and
    d) a scaling characteristic specifying information associated with an upscaling and/or a downscaling activity that has been applied to the data stream.

14. The apparatus of claim 13, wherein one video quality and/or video transport characteristic bit is embedded within each transform coefficient.

15. The apparatus of claim 13, wherein the video quality and/or video transport characteristic bits embedded in a first macro-block of the video frame form a unique key that notifies the second network element that meaningful video quality and/or video transport characteristic bits are present in a second macro-block of the video frame.

16. The apparatus of claim 13, wherein the video quality and/or video transport characteristic bits indicate a specific video processing task performed on the data stream by the first network element, such that the second network element knows not to perform the specific video processing task on the data stream.

17. The apparatus of claim 13, further configured for calculating a quality metric differential that results from a transrating activity associated with the data stream, wherein the video quality and/or video transport characteristic bits embedded in the encoded data stream identify the quality metric differential.

18. The apparatus of claim 13, wherein the video quality and/or video transport characteristic bits embedded in the encoded data stream identify a jitter or delay associated with the data stream.

* * * * *